Feb. 8, 1966   F. BILD ETAL   3,234,303
CONTINUOUS PROCESS FOR THE PRODUCTION OF METHACRYLATE POLYMERS
Filed Dec. 9, 1963
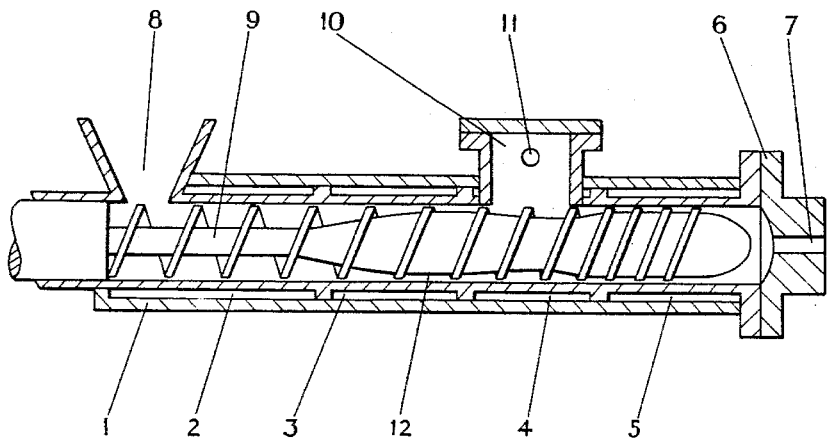
INVENTORS
FREDERICK BILD
ALAN WILLIAM JUKES
BY Cushman, Darby & Cushman
ATTORNEYS United States Patent Office 3,234,303
Patented Feb. 8, 1966

3,234,303
CONTINUOUS PROCESS FOR THE PRODUCTION OF METHACRYLATE POLYMERS
Frederick Bild, Highgate, London, and Alan William Jukes, St. Albans, England, assignors to Imperial Chemical Industries Limited, London, England, a corporation of Great Britain
Filed Dec. 9, 1963, Ser. No. 329,263
Claims priority, application Great Britain, July 3, 1959, 22,903/59
16 Claims. (Cl. 260—876)

This application is a continuation-in-part of our application Serial No. 37,634 filed June 21, 1960, now abandoned.

This invention relates to the production of polymeric material and in particular to the production of polymers and copolymers of methyl methacrylate.

Polymers and copolymers of methyl methacrylate are normally made by an aqueous emulsion or granular polymerisation, or by polymerisation in bulk by heating the monomer or a partially polymerised syrup while contained in a cell formed from two parallel sheets of glass with a flexible gasket round the periphery of the cell. While such processes lead to the production of perfectly satisfactory products, the processes themselves suffer from certain disadvantages. For example, they are essentially batch processes and are not readily adaptable for continuous operation. Also, in the bulk casting method for producing sheet the handling of glass sheets is cumbersome and breakages may occur which increase costs. Furthermore, in the production of polymers for use as moulding granules which may be made by granular polymerisation, it would be an advantage to have a method that avoids the use of ancillary materials e.g. water and granulating agents.

It is an object of this invention, therefore, to provide a process by which polymers and copolymers of methyl methacrylate can be produced continuously. It is a further object to provide such a process that can be carried out in relatively cheap equipment.

According to the present invention we provide a process for the production of polymers and copolymers of methyl methacrylate that comprises providing a polymerisable material consisting solely of methyl methacrylate or if desired a mixture of methyl methacrylate and a copolymerisable monoethylenically unsaturated compound, said polymerisable material being either in monomeric or partly polymerised form and containing from 0.001% to 5% of its weight of a free radical yielding organic polymerisation catalyst that causes polymerisation of said polymerisable material to proceed at a faster rate than when no such polymerisation catalyst is present and which has a half life of from 1 to 60 mins. at a temperature of from 130 to 250° C. continuously feeding said polymerisable material into a reaction apparatus having one or more feed inlets connected by a duct to a delivery outlet said material being caused to flow along at least part of said duct through at least one zone maintained at a temperature of from 130 to 250° C. and thereafter continuously discharging polymerised material from the delivery outlet of said apparatus.

The free radical yielding organic polymerisation catalysts as hereinbefore defined are hereinafter referred to as the polymerisation catalysts. Examples of such catalysts include cumene hydroperoxide, ditertiary butyl peroxide, di-tertiary-butyl-diperphthalate, tertiary-butyl peracetate, tertiary-butyl perbenzoate, di-cumyl peroxide, tertiary-butyl hydroperoxide and methyl ethyl ketone peroxide. The amount of catalyst used is preferably from 0.005 to 1.0% by weight of the polymerisable material. The actual concentration of catalyst used will depend upon its activity, the desired molecular weight of the final polymeric material, the temperature and the desired speed of reaction. If desired, a mixture of catalysts may be used. It will be appreciated that the polymerisation catalysts need not be effective over the whole range of 130 to 250° C. and that it may be necessary to select one or more catalysts appropriate to a particular temperature range when it is desired to work within that particular range. It is necessary to work at temperatures above 130° C. in order to ensure that the material passing into the reaction apparatus is still sufficiently fluid as it polymerises to be capable of flowing through the reaction apparatus. The most useful polymerisation temperatures are from 140 to 180° C. Polymerised materials particularly suitable for use as moulding granules or in sheet form are conveniently made using a polymerisation catalyst which has a half life of 10 min. at a temperature within the range of from 130 to 180° C. and maintaining the polymerisation zone at a temperature of from 140 to 180° C.

The polymerisation reaction is reversible and we therefore prefer that the polymerised material discharged from the reaction apparatus should be substantially free from polymerisation catalyst. If any catalyst should remain this may cause the reverse reaction to proceed if the polymeric material is heated to a high temperature as, for example, in an injection moulding cycle, and free monomer would be liberated which could cause bubbles to appear in the moulded product. It is therefore desirable that any residual catalyst should be substantially destroyed after polymerisation. This can be effected by maintaining the polymerised material during its passage through the reaction apparatus at an elevated temperature preferably for a period equal to at least six times the half life of the catalyst at that temperature. In practice this temperature will normally be higher than the temperature in the polymerisation zone.

The reaction apparatus is conveniently a single- or multi-screw extruder. The barrel of the extruder can be maintained at the desired temperatures by conventional means using known devices to cause heat to be added or subtracted according to whether the reaction conditions along any part of the barrel are endothermic or exothermic. The flight spaces are preferably as shallow as possible consistent with a high output rate in order to get good heat transfer so that the temperature of reaction can be efficiently controlled.

In order to allow the polymerisable material to be carried forward from the feed inlet into the extruder it is normally necessary to apply pressure to the feed. This may be done by means of a pump, or by maintaining a pressure of gas over the fluid polymerisable material as it is contained in the feed hopper of the extruder. The use of pressure also makes it possible to avoid the formation of vapour locks which might otherwise be caused by the boiling of monomeric material.

We prefer that the polymerised material should at some stage pass through a zone in which reduced pressure is maintained in order to remove any residual volatile matter. This zone may be a chamber into which the material passes after leaving the reaction apparatus or the zone may be an integral part of the reaction apparatus. Thus, where the apparatus is an extruder, the zone can take the form of an enlarged part of the barrel connected to a vacuum line. Alternatively, the depth of the flights in the extraction zone can be increased so that the material entering the zone does not fill the free space, and vapour is drawn off through a tube attached to the barrel. Extruders equipped with such vapour extraction devices are well known. With such an extruder it is usual to ensure that the flow of material is restricted immediately before the extraction zone in order that a vacuum is maintained to obtain effective extraction of vapour. In this restriction zone the flow of material can be retarded for example, by decreasing the depth of the screw flights, or decreasing their pitch, for several turns before the extraction zone. Beyond the extraction zone the polymerised material is carried forward by the screw flights and forced through an extrusion orifice.

One suitable form of apparatus for carrying out our process therefore, comprises a screw extruder having at least three zones, the first being a polymerisation zone in which the barrel temperature is maintained at 140–180° C.; in at least part of this zone the reaction will be exothermic and it may be necessary to apply cooling to maintain the barrel temperature within the desired limits. Thereafter there is a zone through which the material passes and in which substantially the whole of any remaining catalyst is destroyed by ensuring that the dwell time of the material in the zone is preferably at least six times the half life of the catalyst at the temperature of the zone. Thereafter the material passes through an extraction zone after which it is carried on to the extrusion orifice.

The accompanying drawing is a cross-sectional elevation of a single-screw extruder suitable for carrying out the process of our invention. Barrel 1 is provided with internal heating zones 2 to 5 for the circulation of a heat transfer medium. Die 6 having an orifice 7 is attached to the delivery end of the barrel. Hopper 8 is provided for the introduction of polymerisable material which is advanced towards the die by rotatable screw 9. An extraction chamber 10 is connected to a vacuum pump (not shown) via outlet passage 11. The depth of the flight spaces immediately before the extraction chamber is decreased to form a restriction zone 12. The flight spaces become less shallow in the area of the extraction chamber, and thereafter both the flight spaces and the flight pitch decrease towards the die.

When a multi-screw, e.g. twin-screw, extruder is used it may not always be possible to take advantage of its maximum pumping capacity and thereby achieve optimum rates of output, while at the same time ensuring that the residence time of the polymerisable material in the polymerization zone of the extruder is long enough to cause substantially complete polymerisation. This is because of the limited barrel lengths in commercially-available machines. One convenient way of overcoming this difficulty is to utilize substantially the entire length of the extruder barrel as a polymerisation zone, and to couple this extruder in series with another, which may be either a single- or multi-screw machine. The second extruder will normally incorporate a catalyst destruction zone and a vapour extraction zone. If desired, more than one multi-screw extruder can feed into the second extruder.

Accordingly, another suitable apparatus for carrying out our invention comprises at least one multi-screw extruder incorporating a polymerisation zone, in which the barrel is maintained at 140 to 180° C., and feeding into either a single- or multi-screw extruder incorporating catalyst destruction and vapour extraction zones. In another arrangement, catalyst destruction may be effected in a heated tube connecting the two extruders. If desired, a second heated tube of larger diameter than the catalyst destruction tube, preferably separated from it by a multi-holed plate, can be interposed between it and the second extruder, the second tube being connected to vacuum.

The polymerisable material may be fed to the reaction apparatus as monomer or as a partially polymerised syrup. The term "partially polymerised" refers to methyl methacrylate monomer, or mixtures of it with other monomers, which have been partially polymerised. The term also refers to mixtures of such monomers with their polymers. If syrup is used it may be desirable to have a pre-reactor in which a large volume of polymerisable material can be polymerised to the desired extent before feeding the syrup to the reaction apparatus. Such a pre-reactor may be in the form of a cylindrical vessel in which the polymerisable material can be heated, for example, from 50 to 200° C. for a sufficient length of time to achieve the desired viscosity. It is normally necessary to include a catalyst in the preparation of the syrup, the particular catalyst used being dependent upon the temperature at which syrup preparation is effected. Thus, for example, where the syrup preparation is carried out at a relatively low temperature e.g. 80° C. a catalyst active at that temperature e.g. $\alpha\alpha'$azodi-isobutyronitrile, could be used. The polymerisation catalyst as hereinbefore defined for effecting polymerisation in the reaction apparatus can be added to the monomer before or after syrup preparation. Alternatively, the syrup can be prepared by dissolving solid polymer in the monomer.

Partially polymerised syrups may also be prepared according to the process of our invention by feeding monomeric material into the reaction apparatus. For example, syrups containing from 10 to 25% by weight of polymer may be readily prepared by passing the polymerisable material and a polymerisation catalyst as hereinbefore defined through a tubular reactor having at least one polymerisation zone maintained at a temperature of from 130 to 250° C., preferably from 140 to 180° C., for a suitable period of time. This period of time which results in the required degree of polymerisation can be readily determined by experiment and depends on the proportion and nature of the catalyst and the rate of flow through the polymerisation zone. Such syrups are particularly useful for impregnating woven or unwoven glass fabrics which are thereafter stacked one above the other and subjected to heat and pressure, whereby the syrup is further polymerised.

When the polymeric material produced by our process is intended primarily for use in the form of granules as a moulding material, good flow properties are required and it is normally necessary to control the polymerisation reaction so that the final polymeric material has a reduced viscosity within a particular range. In the case of homopolymers of methyl methacrylate and copolymers with ethyl acrylate containing up to 15% by weight of ethyl acrylate, we prefer that these polymeric materials should have reduced viscosities of 0.3 to 0.8 dl./g. when measured as a 1% w./v. solution in chloroform at 20° C. To assist in obtaining polymeric material with consistent flow properties, we prefer to carry out the polymerisation reaction in the presence of small proportions of a chain transfer agent. Since our polymeric materials are normally used in moulding processes at temperatures where depolymerisation may occur, we prefer to use chain transfer agents which are also depolymerisation inhibitors. Examples of such compounds include primary mercaptans e.g. lauryl mercaptan, monothioglycol, and thioglycollic acid and its esters. The amount of these compounds used is normally from 0.05 to 1% by weight based on the weight of polymerisable material.

Our process is particularly useful for preparing homopolymers of methyl methacrylate. However, minor amounts, e.g. up to about 5% by weight of other copolymerisable ethylenically unsaturated monomers may be present which do not substantially alter the reaction. Somewhat larger amounts of monoethylenically unsaturated comonomers may be used, e.g. up to about 20%, particularly in the case of styrene, styrenes which are nuclearly substituted with alkyl groups such as p-methyl styrene and with halogen atoms such as p-chlorostyrene, acrylonitrile, acrylamide, methacryamide, ethyl acrylate, methyl acrylate, and other nitriles, amides and lower alkyl esters of α-methylene carboxylic acids such as acrylic acid and methacrylic acid, maleic anhydride, vinylidene chloride, and vinyl esters of lower fatty acids such as vinyl acetate. Particularly useful copolymers are those of methyl methacrylate with small amounts e.g. 0.5–15% by weight of the polymerisable material of the lower alkyl esters of acrylic acid such as methyl, ethyl and octyl, e.g. 2-ethyl hexyl, acrylates.

The polymerisable material may have added to it normal ancillary ingredients which do not influence the reaction substantially, e.g. dyestuffs, pigments, plasticisers, stabilisers, ultra-violet absorbers and polymeric modifying agents such as rubber which improves impact strength. In the case of rubber, the amount introduced into the extruder with the monomer should be limited to that which will not interfere with the reaction, i.e. up to about 30% by weight of the total of rubber and polymer or copolymer. It is known that methyl methacrylate, in the course of its polymerisation, undergoes a peaking or gel effect which should be avoided or minimised to assure an efficient and controllable process when carried out on the large scale. It has been found that, by observing the aforesaid reaction conditions, this gel effect may be minimised while continuously polymerising in an extruder. In the case in which rubber is added, there is a somewhat increased tendency to peaking presumably because the rubber increases the viscosity of the reaction mixture. However, when the above conditions are observed, it is nevertheless possible to carry out the reaction without an undesired degree of peaking, so long as the amount of rubber does not exceed about 30% by weight. When larger amounts of rubber are required, they may be added through an inlet downstream from the monomer inlet, i.e. after the polymerisation is essentially completed. The amount which can be tolerated during the polymerising is easily determined by routine experiment. It will be appreciated that the amount of rubber that can be added without the undesired degree of peaking will depend upon the type of rubber and in particular upon its molecular weight, and degree of cross-linking. Various types of rubber may be used, for example, those described in Ennor et al. application Serial No. 241,486, filed December 3, 1962 and Griffin et al. application Serial No. 293,-194, filed July 5, 1963.

The various ancillary ingredients may be present in the polymerisable material fed to the reaction apparatus. If desired, however, all or some or any part of these materials may be injected into the reaction apparatus at some convenient point along the direction of travel of the material through the reaction apparatus. If required, part of the catalyst may be introduced in a similar way into the reaction apparatus.

Rubbery material when this is to be incorporated with our polymer may be introduced into the reaction apparatus in any convenient manner. It can be dispersed in the monomer or syrup before feeding into the reaction apparatus irrespective of its form. Alternatively, it may be forced into the apparatus at any point so that it becomes dispersed with the polymerisable material as it proceeds along the apparatus; thus it may be forced into the zone in which polymerisation takes place, or it may be fed in at some later stage where polymerisation is complete.

When the rubber is available as a latex or slurry there is no need to dry off the water before the rubber is fed in because the water can be removed as vapour from the reaction apparatus by means of a devolatilisation zone in which the solid material is prevented from filling the zone and an extraction port is provided through which the water vapour is drawn off. Extruders having such devolatilisation zones are well known. In this case also the rubber latex or slurry can be fed in at any convenient point before the devolatilisation zone. We prefer, however, that when a latex or slurry is used the amount of water present should be kept to a minimum because its presence reduces the output of the reactor.

It is also possible to carry out our process by feeding solid polymer into a screw extruder and injecting catalysed polymerisable material into the polymer at some point or points along the barrel of the extruder, the polymerisable material then being polymerised as hereinbefore described. This may be a convenient process to use when it is desired to produce a pigmented polymeric material, the pigment having first been blended with the solid polymer e.g. by dry tumbling, or for producing copolymers.

When introducing soluble dyestuffs or other soluble ancillary ingredients either initially to the polymerisable material or by injection into the reaction apparatus, it may be convenient to dissolve the dyestuff or other ancillary ingredients in an organic solvent in order to get thorough dispersion of the mass of material. The amount of solvent used will normally be very small e.g. for dyestuffs about one part by weight of solvent per 100 parts by weight of polymerisable material may be required. It is desirable that the material should pass through an extraction zone in order to remove such solvent.

The polymeric material emerging from the extruder can be comminuted by any suitable device to render it in a form suitable for feeding into moulding machines. The material is conveniently extruded in the form of rods or laces which are then cut into granules, normally after passage through a water bath. The material may also be directly extruded in the form of sheet or other profiles, e.g. tube.

The moulding granules can be fabricated into a wide variety of articles commonly made from arcylic moulding materials such as telephones, automobile tail and stop lights, reflector plates and television implosion guards. Typical applications for our extruded sheets include lighting fittings, signs, instrument panels and roof lights.

Our invention is more particularly described, but in no way limited, in the following examples, in which all parts are expressed by weight. Reduced viscosities quoted are in dl./g. and relate to 1% w./v. solutions in chloroform at 20° C.

In Examples 1 to 9 and 11 to 25 the extruder into which the polymerisable material was fed was previously filled with polymethyl methacrylate of reduced viscosity 0.5. This was done to insure that the polymerisable material was retained in the extruder until the polymerisation conditions had been established.

*Example 1*

0.2 part of di-tertiary butyl peroxide, 0.35 part lauryl mercaptan and 1 part of stearic acid were dissolved in 100 parts of methyl methacrylate and the solution was poured into the feed hopper of a single-screw extruder 2" in diameter and 39" long up to a vacuum extraction port. The screw before the vacuum extraction port had a depth of ¼" at the hopper and a compression ratio of 2½:1 over the last 14" before the vacuum extraction port. After the vacuum extraction port the screw had a compression ratio of 3½:1 whereby the polymerized material was conveyed to a ⅛" lace die. From 6" to 28" from the hopper the barrel temperature was maintained at 160° C. and the next 11" of barrel were maintained at 180° C. After the vacuum extraction port the barrel temperature was maintained at 175° C. The die temperature was maintained at 162° C. A vacuum, equivalent to about 18" of mercury, was applied at the extraction port which was maintained at 170° C. The extruder screw speed was 10 revolutions per minute.

The atmosphere over the liquid in the hopper was flushed out with nitrogen and the pressure of the nitrogen was maintained at 100 lb./sq. in. As the material passed through the extruder it was polymerized and the extruded polymer lace was quenched in water and cut into granules at an output of 13 g./min. The polymer had a reduced viscosity of 0.54.

*Example 2*

0.2 part of tertiary butyl perbenzoate, 0.35 part of lauryl mercaptan and 1 part of stearic acid were dissolved in 100 parts of methyl methacrylate and fed through the extruder described in Example 1. From 6" to 28" from the hopper the barrel temperature was maintained at 140° C. and the next 11" of barrel were maintained at 160° C. After the vacuum extraction port the barrel temperature was maintained at 170° C. The die temperature was maintained at 170° C. A vacuum, equivalent to about 22" of mercury was applied at the extraction port which was maintained at 160° C. The extruder screw speed was 10 revolutions per minute. The hopper was pressurized as in Example 1.

As the material passed through the extruder it polymised to a polymer which had a reduced viscosity of 0.59. The extruded lace after cooling in water was cut into granules.

*Example 3*

100 parts of methyl methacrylate, 0.225 part di-tertiary butyl peroxide, 0.35 part of lauryl mercaptan and 1 part of stearic acid were fed into the hopper of a twin-screw extruder. The extruder screws were 3½" in diameter, their centres being 3" apart. The extruder was 49" long and had 4 heating zones: (1) from 9" to 18" from the hopper, (2) from 18" to 27" from the hopper, (3) from 27" to 36" from the hopper, (4) from 36" to 49" from the hopper. An electrically-heated ¼" lace die was used. The heating zones were set at (1) 157° C., (2) 160° C., (3) 160° C., (4) 175° C., the screws were rotated at 2 revs./min. and the hopper was pressurized with nitrogen at 80 lb./sq. in. The polymer melt was fed directly from the twin-screw extruder into a 1½" single-screw extruder fitted with two vacuum extraction zones in series, each zone being maintained at 260° C. The temperatures and dwell times in the single-screw extruder were sufficient to destroy the residual initiator before the first extraction zone. The single-screw extruder was fitted with a lace die ⅛" diameter and the extruded polymer cut into granules. The polymer was extruded at an output of 11 lb./hr. and had a reduced viscosity of 0.40.

*Example 4*

0.8 part stearyl alcohol, 0.225 part di-tertiary butyl peroxide and 0.25 part lauryl mercaptan were added to a solution of 20 parts polymethyl methacrylate of reduced viscosity 0.5 in 80 parts methyl methacrylate. The solution was fed to the twin-screw extruder of Example 3. The hopper was pressurised with 80 lb./sq. in. of nitrogen and the heating zones set at (1) 140° C., (2) 140° C., (3) 140° C., and (4) 150° C. The die temperature was controlled at 147° C. The screws were rotated at 10 revs./min. and polymer was extruded at an output of 19.8 lb./hr. It was fed to a 1¼" diameter single-screw extruder fitted with a 6" x 1/16" sheet die. The extruder was 48" long with a vacuum extraction port 19" from the die. Barrel temperatures were maintained at 190° C. before the extraction port and at 175° C. after it. The pressure at the extraction port was equivalent to 7" Hg. A bubble-free sheet was obtained of reduced viscosity 0.45.

*Example 5*

100 parts methyl methacrylate, 0.5 part lauryl disulphide, 1.0 part stearic acid and 0.24 part di-tertiary butyl diperphthalate were fed to the twin-screw extruder described in Example 3. The hopper was pressurised with 80 lb./sq. in. of nitrogen and the heating zones set at (1) 140° C., (2) 140° C., (3) 140° C., and (4) 142° C. The die temperature was controlled at 150° C. The screws were rotated at 5 revs./min. Polymer was extruded at 27.4 lb./hr. and fed to the single-screw extruder described in Example 4. Barrel temperatures were maintained at 190° C. before the vacuum extraction port and at 175° C. after the vacuum extraction port. A pressure equivalent to 7" of mercury was maintained at the extraction port. A sheet, 6" wide and 1/16" thick, was extruded having a reduced viscosity of 0.74.

*Example 6*

100 parts methyl methacrylate and 0.54 part methyl ethyl ketone were fed to the twin-screw extruder described in Example 3. The hopper was pressurised with 80 lb./sq. in. of nitrogen. The heating zones were set at (1) 151° C., (2) 149° C., (3) 150° C., and (4) 150° C., and the die temperature controlled at 149° C. The screws were rotated at 3 revs./min. and polymer was extruded at an output of 11.6 lb./hr. The polymer had a reduced viscosity of 0.56 and a free methyl methacrylate content of 3.4% by weight. The polymer was fed through a 1¼" diameter single-screw extruder fitted with a vacuum extraction port and fitted with a die having a ¼" diameter orifice. The total length of the barrel was 63", the vacuum extraction port being 15" from the die. The barrel temperature between the hopper and vacuum extraction port was maintained at 190° C. and between the extraction port and the die at 175° C. The pressure at the extraction port was equivalent to 7" of mercury. The extruded polymer was water-cooled and converted into granules having a free methyl methacrylate content of 2.8% by weight.

*Example 7*

100 parts methyl methacrylate, 0.1 part tertiary butyl hydroperoxide, 0.3 part lauryl mercaptan and 1 part stearyl alcohol were fed to the apparatus described in Example 3. The hopper was pressurised with 80 lb./sq. in. of nitrogen. The heating zones were set at (1) 150° C., (2) 150° C., (3) 150° C., and (4) 150° C. The screws were rotated at 3 revs./min. and polymer was extruded at an output of 12 lb./hr. The polymer had a reduced viscosity of 0.55.

*Example 8*

100 parts of methyl methacrylate, 1.0 part stearyl alcohol, 0.3 part of lauryl mercaptan and 0.16 part dicumyl peroxide were fed through the extruder described in Example 3. The hopper was pressurized with 80 lb./sq. in. of nitrogen and the heating zones set at (1) 150° C., (2) 150° C., (3) 150° C., and (4) 151° C. The die temperature was controlled at 160° C. The screws were rotated at 4 revs./min. Polymer was extruded at an output of 10.8 lb./hr. It had a reduced viscosity of 0.48 and a free methyl methacrylate content of 4.9% by weight. The polymer was fed through the 1¼" diameter single-screw extruder described in Example 6. The barrel temperature between the hopper and the extraction zone was maintained at 190° C. and between the extraction zone and the die at 175° C. The pressure at the extraction port was equivalent to 7" of mercury. The polymer extruded from the die was water-cooled and cut into granules having a free methyl methacrylate content of 2.4% by weight.

*Example 9*

90 parts methyl methacrylate, 10 parts ethyl acrylate, 0.3 part lauryl mercaptan and 0.225 part di-tertiary butyl peroxide were fed to the apparatus described in Example 3. The hopper was pressurised with 80 lb./sq. in. of nitrogen and the heating zones set at (1) 146° C., (2) 147° C., (3) 146° C., and (4) 148° C. The screws were rotated at 4 revs./min. Polymer was extruded at an output of 13 lb./hr. and had a reduced viscosity of 0.35.

Example 10

0.5 part of tertiary butyl perbenzoate was mixed with 99 parts methyl methacrylate and the solution passed slowly through two coils of stainless steel tubing arranged in series. The first coil, which had a capacity of about 45 mls., was immersed in a bath at 180° C. and the second coil, which had a capacity of about 200 mls. was immersed in a bath at 20° C. The solution was passed through the tubes under 150 lb./sq. in. pressure of nitrogen at a rate of 15 mls./min. Partially polymerised methyl methacrylate syrup was collected after the second coil via a needle valve. The syrup had a polymer content of about 35% by weight.

Example 11

85 parts methacrylate, 50 parts of a latex containing 70% of water and 30% of a rubbery cross-linked 99/1 copolymer of ethyl acrylate and glycol dimethacrylate 0.11 part of di-tertiary butyl peroxide and 0.1 part of lauryl mercaptan were mixed in a stirred vessel and the syrupy mixture was pumped to a twin-screw extruder. The extruder screws were 3½" in diameter and set with their centres 3" apart, the extruder was 49" long and had 4 heating zones: (1) from 9" to 18" from the feed point, (2) from 18" to 27" from the feed point, (3) from 27" to 36" from the feed point, (4) from 36" to 49" from the feed point. Each zone was held at 156° C. The screws were rotated at 10 revs./min.

Beyond the last heating zone was a 1½" single screw extruder fitted with two vacuum extraction zones in series, each held at 260° C. Residence times and temperatures of the polymer before the first vacuum extraction point were sufficient to destroy residual initiator. Water and unpolymerised methyl methacrylate were removed at the vacuum extraction points. The melt was extruded through a ⅛" slit die 6" wide at an output of 7 lb./hr. The resulting translucent sheet had an impact strength more than three times that of unmodified polymethyl methacrylate and also showed increased resistance to crazing by aqueous solutions of detergents.

Example 12

90 parts of methyl methacrylate, 20 parts of a latex containing 50% of water and 50% of a 62/38 methyl methacrylate/butadiene copolymer, 0.11 part di-tertiary butyl peroxide and 0.1 part lauryl mercaptan were mixed in a stirred vessel and the syrupy mixture pumped to the apparatus described in Example 11. (The methyl methacrylate/butadiene copolymer was 70% insoluble in benzene.) Each heating zone of the twin-screw extruder was held at 155° C. and the screws rotated at 10 revs./min. The vacuum extraction zones of the single screw section were maintained at 260° C. and the residence time and temperature before the first extraction zone was sufficient to destroy residual initiator. The melt produced was extruded through a ⅛" slit die at 9 lb./hr. giving a translucent sheet with about twice the impact strength of unmodified polymethyl methacrylate sheet. The extruded sheet also showed increased resistance to crazing by aqueous soltions of detergents.

Example 13

Example 12 was repeated using 85 parts methyl methacyrlate and 30 parts of the methyl methacrylate/butadiene latex. Sheet with about three times the impact strength of unmodified polymethyl methacrylate was produced at 9 lb./hr. The sheet also showed increased resistance to crazing by aqueous solutions of detergents.

Example 14

80 parts of methyl methacrylate, 20 parts of styrene, 0.3 part dicumyl peroxide and 0.1 part of lauryl mercaptan were mixed in a stirred vessel and the mixture was pumped to the twin-screw extruder described in Example 11. The 1st, 2nd, 3rd and 4th zones of that extruder were each maintained at 150° C. and the screws were rotated at 10 revs./min.

The melt from the twin-screw extruder was fed directly to a 1½" single-screw extruder fitted with two vacuum extraction zones in series each held at 260° C. The residence times and the temperature of the polymer before the first vacuum extraction zone were sufficient to destroy the residual initiator. Unpolymerised monomer was removed at the vacuum extraction zones. The single screw extruder was fitted with a ½" circular die maintained at 220° C., and the material was extruded in the form of a clear, transparent rod, free from bubbles and surface imperfections.

Example 15

Using the apparatus described in Example 14, a mixture having the following composition was fed in:

| | Parts |
|---|---|
| Styrene | 3 |
| Methyl methacrylate | 97 |
| Di-tertiary butyl peroxide | 0.1 |
| Lauryl mercaptan | 0.1 |

Each zone of the twin screw extruder was maintained at 155° C.

In this example the single-screw extruder was equipped with a 6" x ⅛" slit die and the product was obtained in the form of a flat, transparent, water-white sheet that was free from bubbles.

Example 16

The process of Example 15 was repeated with the single exception that in place of styrene there was used para-methyl styrene. A similar product was obtained.

Example 17

The process of Example 14 was repeated using the following ingredients for feeding into the twin-screw extruder:

| | Parts |
|---|---|
| Methyl methacrylate | 90 |
| Para-chlorostyrene | 10 |
| Tertiary butyl hydroperoxide | 0.4 |

The heated zones of the twin-screw extruder were each maintained at 150° C. and the single screw extruder was fitted with a 6" x ⅛" slit die. The product was a clear, bubble-free sheet.

Example 18

The process described in Example 9 was repeated using in place of ethyl acrylate 10 parts of methyl acrylate. The product was in the form of clear, water-white, moulding granules.

Examples 19

The process of Example 14 was repeated using the following polymerisable mixture:

| | Parts |
|---|---|
| Methyl methacrylate | 99 |
| Acrylic acid | 1 |
| Di-tertiary butyl peroxide | 0.1 |
| Lauryl mercaptan | 0.1 |

Zones 1, 2, 3 and 4 of the twin-screw extruder were maintained respectively at 160, 155, 155 and 155° C. The product was extruded from the single screw extruder through a lace die of ⅛" diameter to form laces which were cut into granules. The reduced viscosity of the final polymer was 0.7.

This example was repeated using 1 part of methacrylic acid in place of the acrylic acid, giving granules having similar properties.

Example 20

The process of Example 15 was repeated using 3 parts of vinyl acetate in place of the 3 parts of styrene. The product of this example was a flat, bubble-free, water-white sheet.

Example 21

The process of Example 14 was repeated by feeding the following mixture into the twin-screw extruder:

|   | Parts |
|---|---|
| Methyl methacrylate | 90 |
| Vinyl acetate | 10 |
| Di-tertiary butyl peroxide | 0.097 |
| Lauryl mercaptan | 0.088 |

Each of the four heating zones of the twin-screw extruder were maintained at 156° C. and the screws were rotated at 10 revs./min. The single-screw extruder was equipped with a 6" x ⅛" slit die and the product was obtained in the form of a clear, bubble-free, water-white sheet. The polymer had a reduced viscosity of 0.71.

Example 22

The process of Example 21 was repeated using the following recipe:

|   | Parts |
|---|---|
| Methyl methacrylate | 85 |
| Methyl acrylate | 15 |
| Di-tertiary butyl peroxide | 0.2 |
| Lauryl mercaptan | 0.2 |

Each heating zone of the twin-screw extruder was maintained at 155° C. A clear, bubble-free, water-white sheet was obtained.

Example 23

The process of Example 21 was repeated using the following recipe:

|   | Parts |
|---|---|
| Methyl methacrylate | 90 |
| 2-ethyl hexyl acrylate | 10 |
| Di-tertiary butyl peroxide | 0.1 |
| Lauryl mercaptan | 0.1 |

A clear, water-white, bubble-free sheet was obtained.

Example 24

The process of Example 23 was repeated using in place of the monomer mixture stated therein a mixture of 98 parts of methyl methacrylate and 2 parts of 2-ethyl hexyl acrylate. A clear, bubble-free, water-white sheet was obtained similar to that obtained in Example 23 but having a higher softening point.

Example 25

The process of Example 15 was repeated using the following recipe:

|   | Parts |
|---|---|
| Methyl methacrylate | 90 |
| Styrene | 10 |
| Di-tertiary butyl peroxide | 0.09 |
| Lauryl mercaptan | 0.1 |

Each heating zone of the twin-screw extruder was held at 150° C. and the screws were rotated at 10 revs./min. A clear, water-white, bubble-free sheet was obtained. The polymer had a reduced viscosity of 0.66.

We claim:
1. A process for the production of polymers and copolymers of methyl methacrylate comprising continuously feeding, into one end of an elongated reaction zone, a mixture consisting essentially of
   (1) a polymerizable material selected from the group consisting of
   (a) methyl methacrylate
   (b) partially polymerized methyl methacrylate
   (c) mixtures of methyl methacrylate with another ethylenically unsaturyalted copolymerizable monomer, the amount of said monomer being up to 5% by weight and up to 20% by weight in the case of monoethylenically unsaturated copolymerizable monomers
   (d) partially polymerized mixtures of methyl methacrylate with another ethylenically unsaturated copolymerizable monomer, the amount of said monomer being up to 5% by weight and up to 20% by weight in the case of monoethylenically unsaturated copolymerizable monomers, and
   (2) 0.001% to 5% by weight of a free radical yielding organic polymerization catalyst which has a half life of from one to sixty minutes at a temperature from 130 to 250° C., continuously advancing said polymerizable material through said zone, at least part of said zone being maintained at a polymerization temperature of from 130 to 250° C., the polymerizable material and catalyst, during their passage through said reaction zone, being maintained at an elevated temperature for a period equal to at least six times the half life of said polymerization catalyst at that temperature, and thereafter continuously discharging polymerized material from the other end of said elongated reaction zone.

2. A process as set forth in claim 1 in which said other ethylenically unsaturated copolymerizable monomer is styrene.

3. A process as set forth in claim 1 in which said other ethylenically unsaturated copolymerizable monomer is ethyl acrylate.

4. A process as set forth in claim 1 in which said other ethylenically unsaturated copolymerizable monomer is methyl acrylate.

5. A process as set forth in claim 1 in which said other ethylenically unsaturated copolymerizable monomer is paramethyl styrene.

6. A process as set forth in claim 1 in which said other ethylenically unsaturated copolymerizable monomer is parachloro-styrene.

7. A process as set forth in claim 1 in which said other ethylenically unsaturated copolymerizable monomer is acrylic acid.

8. A process as set forth in claim 1 in which said other ethylenically unsaturated copolymerizable monomer is vinyl acetate.

9. A process as set forth in claim 1 in which said other ethylenically unsaturated copolymerizable monomer is 2-ethylhexyl acrylate.

10. A process as set forth in claim 1 in which said polymerisable material consists essentially of methyl methacrylate.

11. A process for the production of polymers and copolymers of methyl methacrylate as set forth in claim 1 in which the amount of said polymerisation catalyst is from 0.005 to 1.0% by weight of said polymerisable material.

12. A process for the production of polymers and copolymers of methyl methacrylate as set forth in claim 1 in which said polymerisation catalyst has a half life of about 10 minutes at a temperature in the range of from 130 to 180° C., and said polymerisation temperature is within the range of from 140 to 180° C.

13. A process for the production of polymers and copolymers of methyl methacrylate as set forth in claim 1 including passing the polymers and copolymers of methyl methacrylate through a part of said zone which is maintained at reduced pressure to remove residual volatile matter.

14. A process for the production of polymers and copolymers of methyl methacrylate as set forth in claim 1 including applying pressure to said polymerisable material as it is introduced into said reaction zone to prevent the formation of vapour locks.

15. A process for the production of polymers and copolymers of methyl methacrylate as set forth in claim 1 in which said polymerisable material contains 0.05 to 1% by weight of a chain transfer agent.

16. A process for the production of polymers and copolymers of methyl methacrylate as set forth in claim 1 in which the polymerisation is carried out in the presence of rubber, the amount of rubber being up to 30% by weight of the total amount of rubber and polymerisable material.

References Cited by the Examiner
UNITED STATES PATENTS

| | | | |
|---|---|---|---|
| 2,426,476 | 8/1947 | Vaughan et al. | 260—78.4 |
| 2,745,824 | 5/1956 | Melchore | 260—95 |
| 2,769,804 | 11/1956 | Hanson | 260—95 |
| 2,931,793 | 4/1960 | Melchore | 260—95 |

JOSEPH L. SCHOFER, *Primary Examiner.*